No. 12,408. REISSUED NOV. 14, 1905.

E. G. ABELL.

HOLDER FOR WINDOW SASHES.

APPLICATION FILED OCT. 12, 1905.

Edward G. Abell,

Inventor,

Witnesses

Thomas J. Byrnes.

S. S. Dunham.

By his Attorneys,

Kerr, Page & Cooper

UNITED STATES PATENT OFFICE.

EDWARD GARLAND ABELL, OF BRISBANE, AUSTRALIA.

HOLDER FOR WINDOW-SASHES.

No. 12,408. Specification of Reissued Letters Patent. Reissued Nov. 14, 1905.

Original No. 783,182, dated April 25, 1905. Application for reissue filed October 12, 1905. Serial No. 282,524.

*To all whom it may concern:*

Be it known that I, EDWARD GARLAND ABELL, a subject of the King of Great Britain and Ireland, and a resident of Brisbane, in the State of Queensland, Commonwealth of Australia, have invented certain new and useful Improvements in Holders for Window-Sashes, of which the following is a specification.

The object of my invention is to provide a simple and effective means for operating window-sashes; and it consists in the combination, with a pair of window-sashes, of an apparatus for holding the same in any position when raised or lowered and for causing the meeting-rails of the two sashes to be separated when the lower sash is raised or the upper sash lowered.

Figure 1:
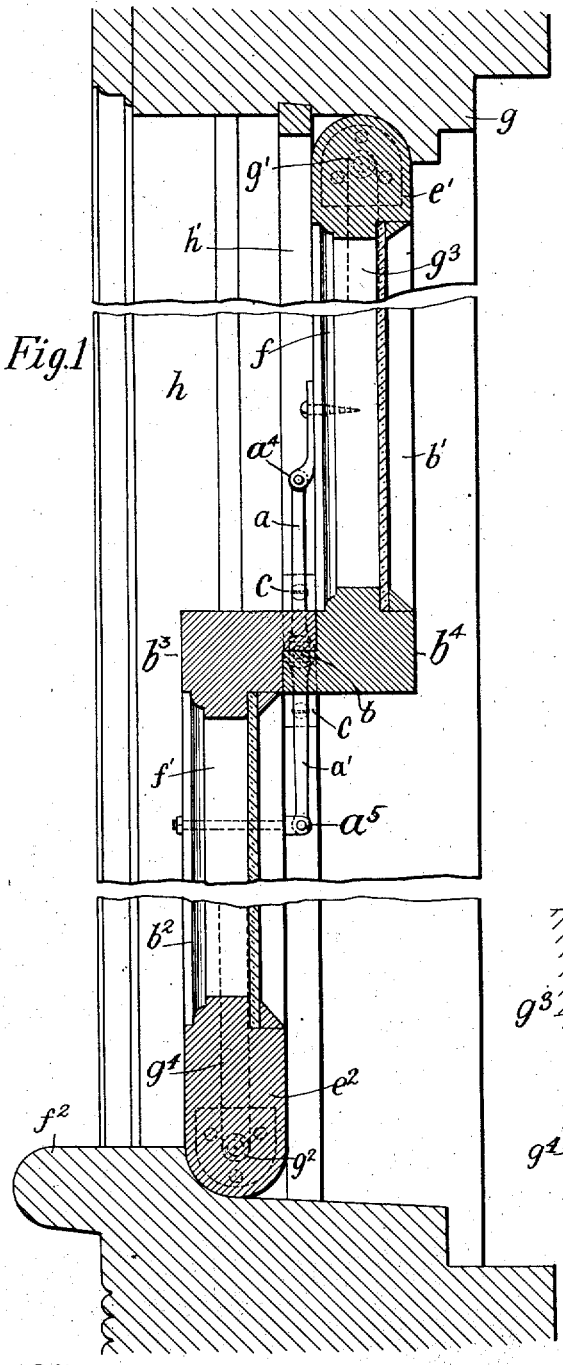
Figure 3:
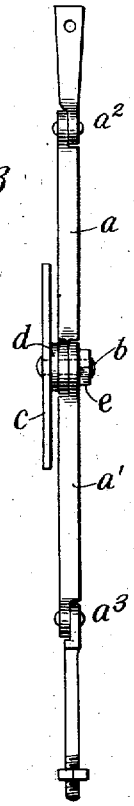
Figure 2:
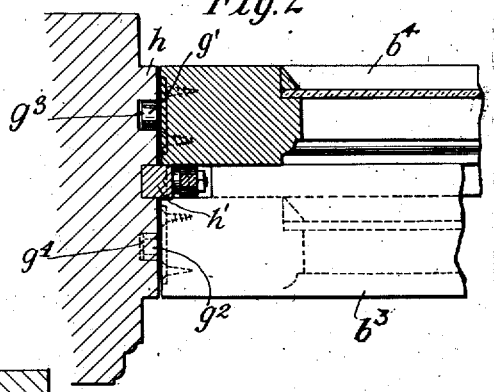

Referring to the drawings, which form a part of the specification, Figure 1 shows a vertical section through a window-frame and sashes to which my improvement is applied. Fig. 2 shows a sectional plan view of the jamb and the upper sash on one side of a window-frame. Fig. 3 is a detail of the window-sash holder.

In Fig. 3, $a$ $a'$ are the two arms of a balance-lever, mounted at their contiguous ends on a pivot-pin $b$, working pivotally in a plate $c$, affixed to the window-jamb. These arms $a$ $a'$ have pivoting eye or loop ends $a^2$ $a^3$ for engagement with pivoting eye pins or plates $a^4$ $a^5$, affixed to the stiles of the top and bottom sashes $b'$ $b^3$, the arm $a$ operating the top sash and the arm $a'$ the bottom sash. The two arms are capable of working independently of each other. $d$ is a collar fixed rigidly to the pivoting-pin $b$, the end of which pin $b$ is threaded to receive a nut $e$. The end of the pin $b$ is burred to prevent the nut from coming off. On screwing the nut tightly up against the arm $a'$ the two arms $a$ and $a'$ are jammed between the nut $e$ and the collar $d$ and act as a single balance-lever. The pivoting-pin $b$ is free to revolve in the plate $c$. From this construction it follows that both top and bottom sashes will be operated simultaneously. The top sash is lowered or the bottom sash raised, and when so operated the meeting-rails $b^3$ $b^4$ of the two sashes will be separated. When it is desired to thus operate both top and bottom sashes at the same time, I prefer to make the balance-lever in one piece and substitute a fixed pivot-pin $b$, inserted through the window-jamb, for the pivotally-working pin in the plate $c$.

In Figs. 1 and 2, $b^3$ $b^4$ are the meeting-rails of a pair of sashes. $b^4$ is the top rail of the upper sash, and $b^3$ the bottom rail of the lower sash. $f$ is the stile of the upper sash, and $f'$ is the stile of the lower sash. $f^2$ is the sill of the window; $g$, the head of the window-opening; $g'$, a pin projecting from a plate secured to the back of the stile of the upper sash and working in a groove $g^3$ of the jamb $h$ of the window-opening. $g^2$ is a similar pin projecting from a plate secured to the back of the stile of the lower sash and adapted to work in a groove $g^4$ of the jamb $h$ of the window-opening. Similar pins and grooves are employed in each sash on opposite sides of the window-opening. Said pins may have rollers fitted over the ends of the same, which work in the grooves of the window-jambs. $h'$ is a parting-strip between the two sashes, which prevents the lower sash from swinging outward and the upper sash from swinging inward.

The sash-holder $a$ $a'$ is designed to be affixed to the sashes and jambs on each side of the window-opening. Fig. 1 shows the holder in position when the sashes are closed.

The two arms $a$ and $a'$ of the holder when rigidly connected together or when made in one piece not only effect the separation of the meeting-rails and the lowering of the top sash when the bottom sash is raised, but the top and bottom sashes balance each other in any position, whether closed or partly or fully open. The full motion of the lever on pivot $b$ is one-half of a circle.

The pivoting-pin $b$ may not always be fixed to the window-jamb centrally between the meeting-rails $b^3$ $b^4$, but may be affixed to the jamb either above or below the center of said meeting-rails.

Having thus described my invention, what I claim, and desire to secure by Letters Patent, is—

1. In an improved holder for window-sashes, the combination with a window-frame; of a pair of sashes capable of being bodily raised and lowered between the jambs of the said frame, the upper sash being provided at its top and the lower sash at its bottom with means for pivotal engagement with the jambs; and a balance-lever pivoted between its ends to the frame and at its ends to the upper and lower sashes respectively; as set forth.

2. In an improved holder for window-sashes, the combination with a window-frame having jambs provided with vertical grooves on their inner faces; of a pair of sashes capable of being bodily raised and lowered between the jambs, the upper sash being provided at its top and the lower sash at its bottom with studs extending into the said grooves; and a balance-lever pivoted between its ends to the frame and at its ends to the upper and lower sashes respectively; as set forth.

3. In an improved holder for window-sashes, the combination with a window-frame; of a sash capable of being bodily raised and lowered between the jambs of the said frame, and provided at one end with means for pivotal engagement with the said jambs; and an arm pivoted to the sash and to the frame; as set forth.

4. In an improved holder for window-sashes, the combination with a window-frame; of a pair of pivoted sashes capable of being bodily raised and lowered between the jambs of the said frame; a pair of arms pivoted to the upper and lower sashes and having common pivotal connection with the frame; and means for preventing movement of the arms independently of each other; as set forth.

5. In an improved holder for window-sashes, the combination with a window-frame, of pivoted and sliding sashes therefor, a pin rotatably secured thereto, arms pivotally mounted on the pin and movable independently of each other, the ends of the arms being pivotally connected with the window-sashes, and means for securing the arms rigidly to said pin at will; as set forth.

In witness whereof I have hereunto set my hand this 6th day of September, 1905.

EDWARD GARLAND ABELL.

In presence of—

CHEO. HOUGH,

CLARA ABELL.